United States Patent [19]
Hosoi et al.

[11] Patent Number: 5,952,400
[45] Date of Patent: Sep. 14, 1999

[54] DENTAL SOFT RELINING MATERIAL, DENTURE AND METHOD OF REPAIRING DENTURE

[75] Inventors: Yasuhiro Hosoi; Osamu Iwamoto, both of Tokuyama, Japan

[73] Assignee: Tokuyama Corporation, Yamaguchi-ken, Japan

[21] Appl. No.: 09/024,406

[22] Filed: Feb. 17, 1998

[51] Int. Cl.$^6$ .................................................. A61C 13/23
[52] U.S. Cl. ...................... 523/120; 524/731; 433/168.1
[58] Field of Search ........................... 523/120; 524/731; 433/168.1

[56] References Cited

U.S. PATENT DOCUMENTS

| | | | |
|---|---|---|---|
| 5,513,987 | 5/1996 | Hosoi et al. | 433/168 |
| 5,830,951 | 11/1998 | Fiedler | 525/478 |

FOREIGN PATENT DOCUMENTS

| | | |
|---|---|---|
| 0340129 | 11/1989 | European Pat. Off. . |
| 0614655 | 9/1994 | European Pat. Off. . |

OTHER PUBLICATIONS

Database WPI, Week 9512, Derwent Publications Ltd., London, GB and JP 07 010 524A (Tokuyama Soda), Jan. 13, 1995.

Primary Examiner—Robert Dawson
Assistant Examiner—Caixia Lu-Rutt
Attorney, Agent, or Firm—Sherman and Shalloway

[57] ABSTRACT

The present invention provides a composition having sufficient strength and softness and excellent resistance against coloring, which is suited for use as a dental soft relining material. The present invention relates to a dental soft relining material which comprises 100 parts by weight of an organopolysiloxane (A) having in a molecule thereof at least two organic groups with a terminal unsaturated bond, an organohydrogenpolysiloxane (B) having in a molecule thereof at least three SiH groups, in such an amount that a ratio of the total number of SiH groups of (B) to the total number of terminal unsaturated bonds present in the organopolysiloxane molecules of (A) is from 0.5 to 5, a catalytic amount of a catalytic substance (C) for hydrosilylation reaction, 10 to 300 parts by weight of polyorganosilsesquioxane particles (D), and 1 to 50 parts by weight of hydrophobic silica particles (E) having a number of silanol groups per a unit surface area of not greater than $1/nm^2$ so that a hydrophobic index is not smaller than 60%, said hydrophobic index being defined by a minimum methanol amount (concentration) necessary for completely suspending said silica particles in a methanol aqueous solution.

8 Claims, No Drawings

DENTAL SOFT RELINING MATERIAL, DENTURE AND METHOD OF REPAIRING DENTURE

BACKGROUND OF THE INVENTION

1. (Field of the Invention)

The present invention relates to a dental soft relining material of the type of a silicon rubber used on the mucosa surface of a resin denture base, to a denture, and to a method of repairing the denture.

2. (Prior Art)

Patients who need a denture and, particularly, a full denture, in many cases, are aged persons, and their alveolar ridges must bear an increased occlusion force per a unit area since the bone has generally been resorbed to a conspicuous degree. The mucosa of alveolar ridge becomes thin due to senile atrophy, and the occlusion stress or masticatory pressure is not softened but is directly transmitted to the alveolar bone. Moreover, a thin mucosa disposed between a hard resin denture base and the hard alveolar bone is tightened and gets hurt after every occlusion, and begins to feel pain.

In such a serious case, the resin denture base molded by using a methyl methacrylate resin that is usually used is not sufficient for stably maintaining and supporting the denture. It is necessary to reline the mucosa surface of the resin denture base with a soft dental relining material to compensate the lost viscoelasticity of the mucosa of the residual alveolar ridge, in order to impart cushioning property that softens the occlusal stress. That is, the object of reining with a soft material is to overcome various troubles that develop when the mucosa below denture is compressed by the hard denture base.

Dental soft relining materials used, so far, for the clinic include a (meth)acrylic acid ester polymer, a fluorine-contained resin, a polyolefin type resin, a silicone rubber, and the like. For temporary applications, furthermore, there is used a denture adhesive (so-called false tooth adhesive). As for the denture adhesive, the consistency increases as it is used for extended periods of time and the plasticity decreases. As a result, the fit and marginal shut of ill-fitting denture are not improved and, hence, the object of enhancing the stability and support of the denture base is not fully accomplished and, besides, the oral tissue is damaged in many cases. Moreover, since the denture has a small compressive stress and lacks elasticity, its cushioning effect is not sufficient for the occlusal stress and that becomes a cause of the recurrence of pain in the oral mucosa.

The soft material such as the (meth)acrylic acid polymer or the like lacks chemical stability in the oral cavity, becomes hard and brittle within several months, and are not usable for extended periods of time. The fluorine-contained relining material lacks viscoelasticity from which sufficient cushioning effect cannot be expected. The polyolefin type relining material has many problems from a practical point of view. That is, it may deform the resin denture base because the preparation temperature is high, and it requires a plurality of adhesives and a special heating device, involving a cumbersome operation. The silicone rubber-type relining material is relatively stable. However, the conventional relining materials of the condensed type or of the heated silicone rubber-type get colored and are not satisfactory in regard to durability and operability, since they cannot be trimmed. As a method of solving these problems inherent in the relining material of the silicone rubber type, therefore, we have proposed a relining material of the addition-type silicone rubber (U.S. Pat. No. 5,513,987, Japanese Laid-Open Patent Publication No. 41411/1995). However, this soft relining material is not still satisfactory from the relation of the strength and the resistance against being colored. That is, when a fine powdery silica such as fumed silica is added at a large ratio to further increase the strength of the silicone rubber, the cured product exhibits an increased strength but is, at the same time, colored to a large extent, and does not necessarily exhibit satisfactory properties for use as a soft relining material. The reason is because, the soft relining material is used for more than a year and often several years in an environment of oral cavity. It cannot be said that the relining material offers a satisfactory function if it breaks, cracks or is conspicuously contaminated upon absorbing oils in the foods or saliva during the use. That is, the former one is related to a form involving trouble in the function, and the latter one is related to a problem of environment in which it is used, such as offensive odor, appearance, etc. It is therefore demanded to further increase the strength and resistance against being colored.

As described above, the dental soft relining material for denture base provided so far loses physical properties after the use of a short period of time, can be used in the oral cavity for only a short period of time, cannot offer satisfactory cushioning effect, can be used requiring cumbersome method, and is not practicable. Among them, even the soft relining material of the addition-type silicone rubber that had been thought to be capable of enduring the clinical use, is not satisfactory from the relation of both the strength and the resistance against being colored. It has therefore been desired to provide a soft relining material for dental use having a suitable viscoelasticity and a sufficient degree of strength and a resistance against being colored. In particular, the soft relining material for dental use having such properties is strongly demanded toward the coming aging society.

SUMMARY OF THE INVENTION

The present inventors have conducted a keen study in order to solve the above-mentioned problems inherent in the dental soft relining material of the addition-type silicone rubber, and have succeeded in developing a soft relining material for dental use that exhibits excellent durability and resistance against being colored as a result of using polyorganosilsesquioxane particles as a filler in combination with a fine powdery silica that is treated to be hydrophobic to a high degree, and can be used for extended periods of time yet exhibiting softness and strength to a sufficient degree, and have thus completed the present invention.

That is, according to the present invention, there is provided a dental soft relining material comprising:

(A) 100 parts by weight of an organopolysiloxane having in a molecule thereof at least two organic groups with a terminal unsaturated bond;

(B) an organohydrogenpolysiloxane having in a molecule thereof at least three hydrogen atoms bonded to silicon atoms (at least three SiH groups), in such an amount that a ratio (hereinafter often referred to as H/V ratio) of the total number of said hydrogen atoms per one unsaturated bond in the component (A) is from 0.5 to 5;

(C) a catalytic amount of a catalytic substance for hydrosilylation reaction;

(D) 10 to 300 parts by weight of polyorganosilsesquioxane particles; and (E) 1 to 50 parts by weight of hydrophobic silica particles so that the number of silanol groups per a unit surface area is not greater than $1/nm^2$ and a hydrophobic index is not smaller than 60%, said hydrophobic index is defined by methanol concentration by volume % in an aqueous methanol solution containing 50 ml of water in a condition to be able to suspend completely 0.2 g of said silica particles at lowest methanol concentration.

According to the present invention, furthermore, there is provided a method of repairing a denture comprising applying the above-mentioned dental soft relining material to the mucosa surface of the denture and/or to the alveolar model, and, then, adhering said denture to the residual ridge or the alveolar model with force, followed by curing said relining material.

According to the present invention, there is further provided a denture comprising a denture and a soft relining material layer provided on the side of the mucosa surface of the denture, wherein said soft relining material layer comprises a cured product of said dental soft relining material.

DETAILED DESCRIPTION OF THE PREFERRED EMBODIMENTS

A organopolysiloxane having in a molecule thereof at least two organic groups with a terminal unsaturated bond, which is the component (A) used in the present invention, is a main component that forms a rubbery elastic material upon being crosslinked with an organohydrogenpolysiloxane having in a molecule thereof at least three SiH groups, which is the component (B). Hereinafter, the "organopolysiloxane having an unsaturated bond in the molecule thereof" and the "organohydrogenpolysiloxane having SiH groups in the molecule thereof" will often be simply referred to as "unsaturated bond-containing siloxane" and "SiH siloxane".

There is no particular limitation in the structure of the unsaturated bond-containing siloxane which is the component (A) provided it is an organopolysiloxane having in a molecule thereof at least two organic groups with a terminal unsaturated bond; the unsaturated bond-containing siloxane may be either of the type of a straight chain or a branched chain, or may be a mixture thereof. There is no particular limitation on the viscosity, either. From the standpoint of the property of the paste before cured and the property of the product after cured, however, it is desired that the viscosity is from about 10 to about 10000 poises. More preferably, the viscosity is from 10 to 1500 poises and, particularly, from 10 to 500 poises. When plural kinds of unsaturated bond-containing siloxanes are used being mixed together as the component (A), however, the viscosity stands for that of the mixture.

Examples of the organic group having a terminal unsaturated bond present in the molecules of the unsaturated bond-containing siloxane which is the component (A), include a vinyl group, an allyl group, a 1-butenyl group, an ethynyl group, etc. However, the vinyl group is most advantageous since it can be easily synthesized. The organic groups with a terminal unsaturated bond may exist at the terminals of the molecular chains of the organosiloxane, at intermediate portions thereof or at both of them. It is, however, desired that at least one of them exists at a terminal so that the elastic material after cured exhibits excellent physical properties.

As the organic group other than the above-mentioned "organic groups with a terminal unsaturated bond" present in the molecules of the unsaturated bond-containing siloxane which is the component (A), there can be exemplified an alkyl group such as methyl group, ethyl group, propyl group, butyl group or octyl group, an aryl group such as phenyl group, or a substituted alkyl group such as chloromethyl group or 3,3,3-trifluoropropyl group. Among them, the methyl group is most preferred since it can be easily synthesized and exhibits favorable physical properties after cured.

Concrete examples of the unsaturated bond-containing siloxane which is the component (A) used in the present invention will be organopolysiloxanes represented by

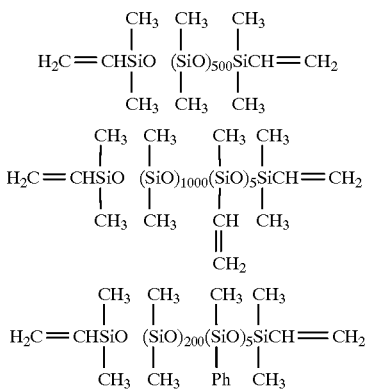

wherein Ph is a phenyl group.

In the above-mentioned compounds and in the compounds used in Examples and Comparative Examples appearing later, the order of bonding the recurring constituent units is quite arbitrary, and the numbers of recurring constituent units shown in the structural formulas merely represent total weights of the constituent units.

The SiH siloxane which is the component (B) of the present invention works to form a rubbery elastic material upon being crosslinked with the unsaturated bond-containing siloxane which is the component (A). In order to obtain the crosslinked structure upon the reaction with the unsaturated bond-containing siloxane, it is necessary that each molecule has at least three hydrogen atoms (i.e., SiH groups) bonded to silicon atoms. When the number of the SiH groups present in the molecule is not larger than three, the rubbery elastic material with a crosslinked structure is not obtained.

There is no particular limitation on the organic groups present in the molecules of the SiH siloxane which is the component (B), and there can be exemplified those similar to the organic groups other than the "organic groups with a terminal unsaturated bond" present in the molecules of the unsaturated bond-containing siloxane which is the component (A). From the standpoint of easy synthesis imparting favorable physical properties after cured, however, it is most desired to use the methyl group. Such an SiH siloxane may be of the straight-chain type, a branched type or a cyclic type, or may be a mixture thereof.

Concrete examples of the SiH siloxane which is the component (B) used in the present invention will be organohydrogenpolysiloxanes represented by

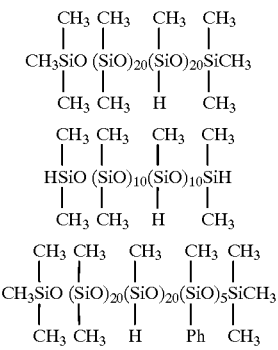

-continued

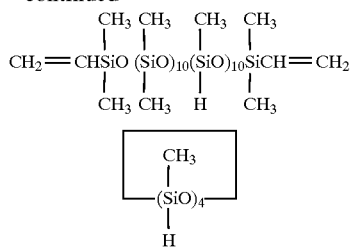

In the above-mentioned SiH siloxane and in the SiH siloxanes used in Examples and Comparative Examples appearing later, too, the order of bonding the recurring constituent units in the molecules is quite arbitrary like in the unsaturated bond-containing siloxane which is the component (A).

In the dental soft relining material of the present invention, the amount of the component (B) that is blended varies depending upon the amount of the component (A) that is used and, particularly, depending upon the total number of the terminal unsaturated bonds present in the molecules of the unsaturated bond-containing siloxane which is the component (A). Therefore, the amount of the component (B) that is blended can be expressed by a ratio $(H/V=[SiH]_B/[C=C]_A)$ of a total number of SiH groups in the component (B) to a total number of terminal unsaturated bonds present in the molecules of the unsaturated bond-containing siloxane which is the component (A). The dental soft relining material of the present invention is blended with the component (B) in an amount of from 0.5 to 5 in terms of the ratio $[SiH]_B/[C=C]_A$ from the standpoint of softness of the obtained cured product. When the blending amount of the SiH siloxane which is the component (B) is within a range of from 0.5 to 5 in terms of the ratio $[SiH]_B/[C=C]_A$, the obtained cured product exhibits a suitable degree of elasticity with very little foaming that stems from an excess of SiH groups, lending itself well for use as a dental soft relining material. More preferably, the component (B) is blended in an amount of from 0.5 to 3 in terms of the ratio $[SiH]_B/[C=C]_A$.

When the SiH siloxane which is the component (B) is blended in an amount of from 0.5 to 5 in terms of the ratio $[SiH]_B/[C=C]_A$, the component (B) may be further blended with a organohydrogenpolysiloxane component containing in a molecule thereof two or one hydrogen atoms bonded to silicon atoms (hereinafter often simply referred to as component (F)) in such an amount that a ratio $(H'/V=[SiH]_F/[C=C]_A)$ of the total number of SiH groups in these components to a total number of terminal unsaturated bonds present in the molecules of the unsaturated bond-containing siloxane which is the component (A) is from 0 to 5. The component F that is blended makes it possible to increase flexibility. Particularly preferably, the component F is blended in an amount of from 0.1 to 5 in terms of the ratio $[SiH]_F/[C=C]_A$.

Any catalytic substance for hydrosilylation reaction can be used as the component (C) for the present invention without limitation provided it is the one used for the ordinary hydrosilylation reaction. Its examples may be platinum-type catalytic substances such as chloroplatinic acid, an alcohol-modified product thereof, a vinyl siloxane complex of platinum, and the like, as well as similar rhodium-type catalytic substances. It is, however, desired to use a platinum-type catalyst since it can be easily obtained. From the standpoint of enhancing the preservation property, furthermore, it is desired to use the vinyl siloxane complex of platinum containing little chlorine component.

There is no particular limitation when the catalytic substance for hydrosilylation reaction is used in an amount sufficient for effecting the hydrosilylation reaction. Here, for example, the platinum-type catalytic substance is used in an amount of from 0.1 to 1000 ppm reckoned as platinum weight per the total weight of the components (A) and (B). When the platinum-type catalytic substance is blended in an amount of smaller than 0.1 ppm, the crosslinking reaction does not sufficiently proceed between the unsaturated bond-containing siloxane and the SiH siloxane. When the blending amount is larger than 1000 ppm, on the other hand, platinum black precipitates causing the cured product to be colored in yellow or, in an extreme case, in black, and making it difficult to control the crosslinking reaction.

Fine particles of the polyorganosilsequioxane which is the component (D) and hydrophobic silica particles so that a number of silanol groups per a unit surface area is not greater than $1/nm^2$ and a hydrophobic index is not smaller than 60% of the component (E) used in the present invention, works as a reinforcing material for the silicon rubber obtained from the unsaturated bond-containing siloxane which is the component (A), SiH siloxane which is the component (B) and catalytic substance for hydrosilylation reaction which is the component (C).

Any known polyorganosilsesquioxane fine particles can be used as the component (D) for the present invention. Examples of the organic groups present in the polyorganosilsesquioxane include alkyl group such as methyl group, ethyl group, propyl group, butyl group or octyl group; alkylene group such as vinyl group, aryl group or 1-butenyl group; aryl group such as phenyl group; substituted alkyl group such as chloromethyl group, 3,3,3-trifluoropropyl group; and hydrogen atom. Among them, those which are substituted by methyl group or those which are substituted by methyl group and partly substituted by the above-mentioned organic groups, are preferably used since they can be easily synthesized and maintain favorable physical properties after cured.

Representative examples of the polyorganosilsesquioxane used in the present invention include polymethylsilsesquioxane, poly(50 mol % methyl+50 mol % phenyl) silsesquioxane, poly(99 mol % methyl+1 mol % hydrogen) silsesquioxane, etc.

As the fine polyorganosilsesquioxane particles, there can be preferably used the one obtained by hydrolyzing or condensing any one of an organotrialkoxysilane or a hydrolyzed product thereof or a condensation product thereof, or more kinds thereof as a mixture in an aqueous solution of ammonia or amines, since it contains almost no impurities such as chlorine atoms, alkaline earth metals or alkali metals, and remains in a spherical form.

There is no particular limitation on the average particle diameter of the fine polyorganosilsesquioxane particles of the component (D). Generally, however, there are used fine particles having an average particle diameter of from 0.1 to 100 $\mu$m and, preferably, from 0.1 to 20 $\mu$m. The fine particles having an average particle diameter of smaller than 0.1 $\mu$m are difficult to produce, and the fine particles having an average particle diameter of larger than 100 $\mu$m tend to exhibit decreased reinforcing effect.

The fine polyorganosilsesquioxane particles of the component (D) are blended in an amount of from 10 to 300 parts by weight and, preferably, from 10 to 200 parts by weight per 100 parts by weight of the unsaturated bond-containing siloxane which is the component (A). When the blending amount is smaller than 10 parts by weight, the elastic material after cured fails to exhibit sufficient machinability. When the amount exceeds 300 parts by weight, on the other hand, the fine particles are difficultly dispersed in the system, and a favorable paste is not obtained. Besides, the elastic material after cured exhibits poor rubbery elasticity, loses reinforcing effect, and exhibits deteriorated mechanical strength.

The hydrophobic silica particles of the component (E) form a filler for imparting a sufficient strength to the dental soft relining material of the present invention without losing softness. As a filler for greatly reinforcing the silicon rubber, in general, there has been known a fine powdery silica, i.e., silica particles having a large surface area. Generally, however, the silica particles are highly hydrophilic and are colored to a large extent when used for the dental soft relining material. It can be considered that the degree of coloring can be lowered (resistance against coloring can be enhanced) if the hydrophilic property of the silica particles is weakened, i.e., if their hydrophobic property is enhanced. The effect, however, is not exhibited to a satisfactory degree by simply enhancing the hydrophobic property. That is, as an index for indicating the degree of hydrophobic index of the silica particles, there has been proposed a hydrophobic index defined as described below by utilizing the fact that highly hydrophobic silica particles float on the water but are completely suspended in methanol. However, a simply heightened hydrophobic index (e.g., not lower than 60%) is not sufficient for lowering the degree of coloring. Here, the hydrophobic index is defined to be a methanol concentration (% by volume) in an aqueous methanol solution containing 50 ml of water capable of completely suspending 0.2 g of the silica particles at the lowest methanol concentration.

According to the present invention, therefore, use is made of hydrophobic silica particles (component E) so that a number of silanol groups per a unit surface area is not greater than $1/nm^2$ in addition to having a hydrophobic index of not smaller than 60%. The hydrophobic index can be increased to be not smaller than 60% if the silica particles are treated with a silicon oil or a silane coupling agent. However, use of such hydrophobic silica particles is not enough to impart a resistance against coloring when the number of silanol groups present on the silica surfaces exceeds $1/nm^2$ (see Comparative Example 6 appearing later). To further enhance the resistance against coloring, it is desired to use hydrophobic silica particles having a hydrophobic index of not smaller than 60% and the number of silanol groups on the surfaces of not larger than $0.3/nm^2$. The silanol groups present on the surfaces of the hydrophobic silica particles can be determined by the Carl-Fisher's method.

It is not at present clear why resistance against coloring is not obtained to a satisfactory degree by simply enhancing the hydrophobic index. The present inventors, however, presume the reasons to be as described below. That is, despite there exist relatively large number of silanol groups on the surfaces of the silica, the hydrophobic index increases when there exists a hydrophobic property-imparting agent such as a highly hydrophobic silicon oil or silane coupling agent on the surfaces. However, the hydrophobic property-imparting agent that has not been secured by chemical bond to the surfaces of the silica particles, extinguishes due to elution, and the effect is not exhibited to a satisfactory degree. Or, even when the hydrophobic property-imparting agent does not extinguish, the silanol groups remaining in many number on the surfaces may bond (associate) to substances which are causes of coloring.

The hydrophobic silica particles of the component (E) can be produced without any limitation according, preferably, to a method disclosed in Japanese Laid-Open Patent Publication No. 10524/1995. Namely, according to this method, the starting silica particles having silanol groups in a number of not larger than $1.5/nm^2$ per a unit surface area are brought into contact with a hexamethyldisilazane in the presence of water vapor. The starting silica particles having silanol groups in a number of not more than $1.5/nm^2$ per a unit area can be obtained by various methods. For example, there can be used silica particles just after the production by the flame pyrolysis or hydrolysis of a halogenosilane without yet absorbing moisture, or those preserved avoiding absorption of moisture. The starting silica particles can also be prepared by being surface-treated with a monomethylchlorosilane or a trimethylchlorosilane.

The component (E) is blended in an amount of from 1 to 50 parts by weight and, preferably, from 1 to 20 parts by weight per 100 parts by weight of the unsaturated bond-containing siloxane which is the component (A). When the blending amount is smaller than 1 part by weight, the elastic material after cured is not reinforced to a sufficient degree. When the blending amount exceeds 50 parts by weight, on the other hand, the component (E) is difficultly dispersed in the system, and a favorable paste is not obtained.

The composition comprising the above-mentioned components (A) to (E) can be used as an excellent soft relining material for dental use. As required, however, other fillers and additives may be added to the soft relining material of the present invention within a range in which they do not greatly impair the properties. Representative examples of the filler include a silica powder such as pulverized quartz which has not been treated or is treated to a slight degree, fused silica, colloidal silica or fumed silica, a fluorocarbon resin powder such as polytetrafluoroethylene or polyvinylidene fluoride, carbon black, glass fiber, pulverized polymer, powdery polymer or composite filler (composite product of an inorganic oxide and a polymer, that is pulverized). As the additives, there can be used a hydrogen gas-absorbing agent such as black platinum or fine particulate palladium, or nonreactive polysiloxane, reaction suppressing agent, ultraviolet ray-absorbing agent, plasticizer, pigment, antioxidant, antibacterial agent, etc.

According to the present invention, preferred examples of the dental soft relining material are as described in (i) to (v) below.

That is, (i) a dental soft relining material comprising 100 parts by weight of the component (A), the component (B) in an amount of from 0.5 to 3 in terms of a ratio $[SiH]_B/[C=C]_A$, the component (C) in a catalytic amount, the component (D) in an amount of from 10 to 200 parts by weight, and the component (E) in an amount of from 1 to 20 parts by weight; (ii) a dental soft relining material of (i) above further containing the component (F) in an amount of from 0.1 to 5 in terms of a ratio $[SiH]_F/[C=C]_A$; (iii) a dental soft relining material of (i) or (ii) above in which the component (C) is a platinum-type catalytic substance for hydrosilylation reaction and in which the component (C) is blended in an amount of from 0.1 to 1000 ppm (expressed as a platinum weight per the total weight of the components (A) and (B)); (iv) a dental soft relining material of any one of (i) to (iii) above in which the component (E) is a particulate hydrophobic silica so that a number of silanol groups per a unit surface area is not greater than $0.3/nm^2$ and a hydrophobic index is not smaller than 60%; and (v) a dental soft relining material according to any one of (i) to (iv) above in which the component (A) has a viscosity of from 10 to 1500 poises and, particularly, from 10 to 500 poises.

The dental soft relining material of the present invention is prepared in the form of two packages in which the component (B) and the component (C) do not exist together (hydrosilylation reaction does not take place during the preservation), e.g., which consists of two packages of one agent comprising the component (A), the component (C), the component (D), the component (E) and, as required, additives; and the other agent comprising the component (B), the component (D), the component (E) and, as required, the component (A) and additives. The two agents are mixed together just before the use.

To prepare these two agents, necessary components are suitably measured out of the components (A), (B), (C), (D), (E) and additives, and are kneaded together using a general kneading machine such as kneader or planetary until the mixture becomes homogeneous to thereby obtain a paste-like composition.

The dental soft relining material of the present invention can be used relying upon the known direct relining method or the indirect relining method. In the case of the direct relining method, the above-mentioned two kinds of pastes are suitably measured and are kneaded together before the use. The kneaded mixture is then applied to the mucosa surface of the denture and is held in the oral cavity of a patient until it is cured to a sufficient degree. After cured, the denture is taken out from the oral cavity and excess portions are removed. In the case of the indirect relining method, the two kinds of pastes are suitably measured and are kneaded together before the use. The kneaded mixture is then applied to the mocosa surface of the denture and is held by a gypsum model of a patient until it is cured to a sufficient degree. After cured, the denture is removed from the gypsum model and excess portions are removed.

After cured, the dental soft relining material obtained according to the present invention exhibits sufficient degree of elasticity and strength, and can be favorably used as the dental soft relining material having excellent resistance against coloring.

EXAMPLES

Described below are Examples for concretely explaining the present invention to which only, however, the invention is in no way limited.

Table 1 shows organopolysiloxanes (component A: compounds a to e having in a molecule thereof an organic group with a terminal unsaturated bond, a compound f without an organic group with a terminal unsaturated bond, a compound g), Table 2 shows SiH siloxanes (component B: compounds h to k having in a molecule thereof two SiH groups, a compound 1), and Table 3 shows hydrophobic silica particles (component E: compounds m to o, control: compounds p and q).

TABLE 1

Organopolysiloxanes $$R^1SiO(SiO)_x(SiO)_y(SiO)_zSiR^2$$

with substituents $CH_3, CH_3, CH_3, CH_3, CH_3$ / $CH_3, CH_3, CH, Ph, CH_3$ and $CH=CH_2$ branch

| Compound | x | y | z | $R^1$ | $R^2$ | Viscosity (poise) |
|---|---|---|---|---|---|---|
| a | 400 | 0 | 0 | $H_2C=CH-$ | $-CH=CH_2$ | 30 |
| b | 700 | 0 | 0 | $H_2C=CH-$ | $-CH=CH_2$ | 100 |
| c | 1000 | 0 | 0 | $H_2C=CH-$ | $-CH=CH_2$ | 1000 |
| d | 1000 | 5 | 0 | $H_2C=CH-$ | $-CH=CH_2$ | 1000 |
| e | 700 | 0 | 200 | $H_2C=CH-$ | $-CH=CH_2$ | 1200 |
| f | 400 | 0 | 0 | $H_2C=CH-$ | $-CH_3$ | 30 |
| g | 400 | 0 | 0 | $CH_3-$ | $-CH_3$ | 30 |

TABLE 2

SiH Siloxanes $$RSiO(SiO)_x(SiO)_y(SiO)_zSiR$$

with substituents $CH_3, CH_3, CH_3, CH_3, CH_3$ / $CH_3, CH_3, H, Ph, CH_3$

| Compound | x | y | z | R |
|---|---|---|---|---|
| h | 20 | 20 | 0 | $CH_3$ |
| i | 80 | 20 | 0 | $CH_3$ |
| j | 20 | 20 | 20 | $CH_3$ |
| k | 20 | 10 | 0 | H |
| l | 10 | 0 | 0 | H |

TABLE 3

Hydrophobic silica particles

| Compound | Specific surface area ($m^2/g$) | Number of OH groups per $nm^2$ | Hydrophobic index (%) |
|---|---|---|---|
| m | 200 | 0.26 | 63 |
| n | 192 | 0.15 | 62 |
| o | 195 | 0.20 | 62 |
| p* | 202 | 0.40 | 56 |
| q* | 196 | 1.23 | 62 |

Compounds marked with * lie outside the scope of the invention.

The hydrophobic silica particles shown in Table 3 were obtained in a manner as described below.

(1) Compound m: Five kilograms of hydrophilic fine silica particles having a specific surface area of 300 $m^2/g$ and silanol groups of a number of 1.4/$nm^2$ on the surface immediately after the production by subjecting a tetrachlorosilane to the flame pyrolysis, were stirred and mixed in a mixer having a volume of 300 liters, and were substituted in a nitrogen atmosphere. The fine silica particles were treated to be hydrophobic at a reaction temperature of 170° C. while supplying a hexamethyldisilazane at a rate of 200 g/min and water vapor at a rate of 22 g/min for 75 minutes. After the reaction, nitrogen was supplied for 30 minutes at a rate of 40 liters a minute to remove ammonia, thereby to obtain hydrophobic silica particles of the compound No. m.

(2) Compound n: Five kilograms of fine silica particles having a specific surface area of 280 $m^2/g$ immediately after the production by subjecting the tetrachlorosilane to the flame pyrolysis, were introduced into a fluidized reactor and were treated to be hydrophobic while introducing a dimethyldichlrosilane at a rate of 20 g/min and the water vapor at a rate of 180 g/min in parallel into the fluidized layer reactor heated at 450° C. for 40 minutes. After the treatment for imparting hydrophobic property, the unreacted products and the by-products were purged with nitrogen and were dried. Through the above-mentioned operation, there were obtained silica particles having a specific surface area of 235 $m^2/g$, a carbon content of 1.6% by weight, a number of silanol groups on the surface of 0.4/$nm^2$ and a hydrophoboc index of 52%. Five kilograms of the silica particles were stirred and mixed in a mixer having a volume of 300 liters and were substituted in a nitrogen atmosphere. The silica particles were treated to be hydrophobic at a reaction temperature of 200° C. while supplying the hexamethyldisilazane at a rate of 200 g/min and the water vapor at a rate of 11 g/min for 75 minutes. After the reaction, nitrogen was supplied for 30 minutes at a rate of 40 liters a minute to remove ammonia, thereby to obtain hydrophobic silica particles of the compound No. n.

(3) Compound o: Hydrophobic silica particles of a compound o were obtained in the same manner as the method of producing the compound n above but effecting the treatment by supplying the hexamethyldisilazane and the water vapor for 60 minutes.

(4) Compound p: Hydrophobic silica particles of a compound p were obtained in the same manner as the method of producing the compound n above but treating the hexamethyldisilazane without using water vapor.

(5) Compound q: Silica particles having a specific surface area of 300 m²/g were permitted to absorb water and were, then, dried to obtain a fine silica having a number of silanol groups on the surface of –4/nm². From the above silica particles, silica particles of a compound q treated to be hydrophobic were obtained in the same manner as that of the above-mentioned compound m.

The number of silanol groups on the surface and the hydrophobic index were measured as described below.

(1) Measurement of the number of silanol groups on the surface: The samples are dried at 120° C. for 12 hours. (By the drying operation, the adhering water disappears and silanol groups only exist on the surface.) The number of the silanol groups on the silica surface of the dried sample is directly measured by using the Carl-Fisher's moisture meter MKS-210 type (manufactured by Kyoto Densi Kogyo Co.) and methanol as the solvent.

(2) Measurement of the hydrophobic index: 0.2 Grams of the hydrophobic silica was added into 50 ml of water in a 250-ml beaker. Methanol was dropwisely added thereto from a burette until the whole amount of the hydrophobic silica was suspended. In this case, the solution in the beaker was maintained stirred at all times by using a magnetic stirrer. The moment at which the hydrophobic silica was all suspended in the solution was regarded to be an end point, and the volume percentage of methanol in the liquid mixture in the beaker at the end point was regarded to be a hydrophobic index.

In the Examples and Comparative Examples, furthermore, the dental soft relining materials were evaluated according to the following method. The same samples were measured or evaluated three times and their average values were recorded.

Two-paste-type samples were examined. (Hereinafter, the two pastes of the sample are represented by paste X and paste Y, respectively.)

(1) Shore A hardness: The pastes X and Y of required amounts were kneaded together, charged into a mold made of a polytetrafluoroethylene (hereinafter abbreviated as PTFE) having a hole 9 mm in diameter and 12 mm in length, and were sufficiently cured in the water at 37° C. After cured, the paste was taken out from the mold, left to stand in the water at 37° C. for 24 hours and was measured for its hardness using a Shore A hardness tester.

(2) Tensile strength and elongation: The pastes X and Y of required amounts were kneaded together, charged into a mold made of a stainless steel having a hole of the shape of a required dumbbell-shaped test piece and a thickness of 2 mm, and were sufficiently cured in the water at 37° C. After cured, the paste was taken out from the mold, left to stand in the water at 37° C. for 24 hours and, then, the tensile strength and elongation at breakage were measured by using an autograph (manufactured by Shimazu Mfg. Co.) at a cross-head speed of 10 mm/min. The parallel portion of the dumbbell-shaped test piece possessed a size of 10 mm in length and 5 mm in width.

(3) Amount of coloring: The pastes X and Y of required amounts were mixed together, charged into a mold of PTFE measuring 10 mm×10 mm×2 mm, and were sufficiently cured in the water at 37° C. After cured, the paste was taken out from the mold, left to stand in the water at 37° C. for 24 hours, and L*, a* and b* of before being colored were measured using a color-difference meter. Thereafter, the test piece was immersed in an aqueous solution containing curry in an amount of 20% by weight and was preserved at 40° C. for 24 hours with stirring. After preserved, the test piece was washed with water, dried, and was measured again for its L*, a* and b* using the color-difference meter. The amount of coloring (ΔE*) was found from the differences ΔL*, Δa* and Δb* in compliance with the following formula, $$\Delta E^* = (\Delta L^{*2} + \Delta a^{*2} + b^{*2})^{1/2}$$

(4) Testing of machinability: The pastes X and Y of required amounts were kneaded together, charged into a mold of PTFE having a hole 9 mm in diameter and 12 mm in length, and were sufficiently cured in the water at 37° C. After cured, the paste was taken out from the mold, left to stand in the water at 37° C. for 24 hours, and was evaluated for its machinability by using a micro-engine for dental use and by using a carbide bar and a silicon point. The evaluation was based upon the grades A to D in compliance with the following determination standards.

A—The surface can be trimmed.

B—The edge portion can be trimmed but the surface can not trimmed.

C—Not trimmed though scratched.

D—Not trimmed at all.

(Example 1)

Into a planetary were introduced a compound b shown in Table 1 in an amount of 100 parts by weight, a vinyl siloxane complex of platinum in such an amount that platinum was 500 ppm with respect to the amount of the compound b, 30 parts by weight of fine polymethylsilsesquioxane particles having a particle diameter of 2 μm, and 30 parts by weight of hydrophobic silica particles. These components were kneaded until the mixture became homogeneous to obtain a paste X.

Into the planetary were introduced 100 parts by weight of the compound b shown in Table 1, 7 parts by weight of a compound i shown in Table 2, 30 parts by weight of fine polymethylsilsesquioxane particles having a particle diameter of 2 μm, and 30 parts by weight of hydrophobic silica particles. These compounds were kneaded until the mixture became homogeneous to obtain a paste Y.

The pastes X and Y of these two kinds were mixed together at a mixing ratio of 1 to 1, and were evaluated in compliance with the above-mentioned evaluation method. The results were as shown in Table 5.

(Examples 2 to 8 and Comparative Examples 1 to 7)

The materials having compositions shown in Table 4 were kneaded using the planetary in the same manner as in Example 1 to prepare pastes. The platinum catalyst used was the same as the one used in Example 1.

By using these pastes, the testing was conducted in compliance with the above-mentioned evaluation method. The results were as shown in Table 5.

TABLE 4

|  | Example 1 | Example 2 | Example 3 | Example 4 | Example 5 | Example 6 | Example 7 | Example 8 |
|---|---|---|---|---|---|---|---|---|
| Paste X | | | | | | | | |
| Unsaturated bond-containing siloxane | b/100 | a/32 d/50 | a/60 c/40 | a/60 c/40 | e/100 | a/60 c/40 | a/48 c/52 | a/48 c/52 |
| Catalyst* (ppm) | Pt (500) | Pt (10) | Pt (200) | Pt (200) | Pt (200) | Pt (100) | Pt (200) | Pt (200) |
| Filler | m/30 PMS**/30 | o/5 PMS/200 f/16 g/2 | n/10 PMS/45 | n/10 PMS/45 | m/10 PMS**/50 | n/10 PMS/45 | n/10 PMS/45 | n/10 PMS/45 |
| Other components | | | | | | | | |
| Paste Y | | | | | | | | |
| Unsaturated bond-containing siloxane | b/100 | a/32 d/50 | a/60 c/40 | a/60 c/40 | e/100 | a/60 c/40 | a/32 c/68 | a/32 c/68 |
| SiH siloxane | i/7 | k/6 | h/2 1/6 | h/2.5 | j/4 | h/1 1/10 | h/2 1/4 | h/1 1/7 |
| Filler | m/30 PMS/30 | o/5 PMS/200 f/16 g/2 | n/10 PMS/45 | n/10 PMS/45 | m/10 PMS/50 | n/10 PMS/45 | n/10 PMS/45 | n/10 PMS/45 |
| Other components | | | | | | | | |
| Mixing ratio (X/Y) | 1/1 | 1/1 | 1/1 | 1/1 | 1/1 | 1/1 | 1/1 | 1/1 |
| H/V ratio (H'/V ratio) | 2.5 | 2.5 | 1.5 (1.5) | 2.5 | 2.5 | 0.5 (2.5) | 1.7 (1.3) | 0.9 (2.1) |

|  | Co. Ex. 1 | Co. Ex. 2 | Co. Ex. 3 | Co. Ex. 4 | Co. Ex. 5 | Co. Ex. 6 | Co. Ex. 7 |
|---|---|---|---|---|---|---|---|
| Paste X | | | | | | | |
| Unsaturated bond-containing siloxane | | a/60 d/40 | a/60 c/40 | b/100 | a/60 c/40 | a/60 c/40 | b/60 c/40 |
| Catalyst* (ppm) | Pt (10) | Pt (200) | Pt (200) | Pt (200) | Pt (200) | Pt (200) | Pt (200) |
| Filler | m/10 PMS/50 | n/10 PMS/45 | m/10 PMS/50 | n/15 | p/10 PMS**/45 | q/10 PMS/45 | PMS/100 |
| Other components | g/100 | | | | | | |
| Paste Y | | | | | | | |
| Unsaturated bond-containing siloxane | | a/60 c/40 | a/60 c/40 | b/100 | a/60 c/40 | a/60 c/40 | b/60 c/40 |
| SiH siloxane | h/5 | l/11 | i/1 | i/7 | h/2 1/6 | h/2.5 | h/2 1/3 |
| Filler | m/10 PMS/50 | n/10 PMS/45 | m/10 PMS/50 | n/15 | p/10 PMS/45 | q/10 PMS/45 | PMS/100 |
| Other components | g/100 | | | | | | |
| Mixing ratio (X/Y) | 1/1 | 1/1 | 1/1 | 1/1 | 1/1 | 1/1 | 1/1 |
| H/V ratio (H'/V ratio) | | (2.5) | 0.3 | 2.5 | 1.5 (1.5) | 2.5 | 2.0 (1.0) |

*: Vinylsiloxane complex of platinum (As a metal amount with respect to unsaturated bond-containing siloxane in the paste X)
**: polymethylsilsesquioxane particles (2 μm in diameter)

TABLE 5

| | | Results | | |
|---|---|---|---|---|
| | Shore A hardness | Tensile strength (kgf/cm²) | Elongation (%) | Amount of coloring (ΔE*) | Machin-ability |
| Example 1 | 45 | 29 | 200 | 4.3 | A |
| Example 2 | 46 | 31 | 180 | 3.0 | A |
| Example 3 | 33 | 21 | 550 | 3.4 | A |
| Example 4 | 36 | 30 | 660 | 3.3 | A |
| Example 5 | 38 | 25 | 660 | 4.5 | A |
| Example 6 | 20 | 18 | 800 | 4.2 | A |
| Example 7 | 33 | 22 | 800 | 4.1 | A |
| Example 8 | 23 | 17 | 1000 | 4.0 | A |
| Com. Ex. 1 | * | * | * | * | * |
| Com. Ex. 2 | * | * | * | * | * |
| Com. Ex. 3 | * | * | * | * | * |
| Com. Ex. 4 | 30 | 20 | 360 | 3.6 | D |
| Com. Ex. 5 | 32 | 20 | 550 | 8.9 | A |
| Com. Ex. 6 | 35 | 28 | 590 | 9.2 | A |
| Com. Ex. 7 | 33 | 12 | 480 | 3.7 | A |

*: Not measureable (not cured)

It will be understood from the results of Table 5 that the dental soft relining materials (Examples 1 to 8) of the present invention exhibit suitable degrees of hardness, sufficient tensile strengths and elongations, small amounts of coloring and favorable machinability. According to Comparative Examples, on the other hand, the paste is not cured when the component (A) is not contained (Comparative Example 1), when the component (B) is not contained (Comparative Example 2), and when the blending amount of the component (B) is smaller than 0.5 in terms of $[SiH]_B/[C=C]_A$ (Comparative Example 3). When the component (D) is not contained (Comparative Example 4), the paste exhibits no machinability. When the hydrophobic silica particles having a hydrophobic index of smaller than 60% is used instead of the component (E) (Comparative Example 5) and when the hydrophobic silica particles having a number of OH groups remaining on the surface of larger than $1/nm^2$ is used instead of the component (E) (Comparative Example 6), the paste is colored in large amounts. When the component (E) is not used (Comparative Example 7), a sufficient degree of strength is not obtained. Thus, the dental soft relining materials fail to exhibit good properties in all of the Comparative Examples.

We claim:
1. A dental soft relining material comprising:
(A) 100 parts by weight of an organopolysiloxane having in a molecule thereof at least two organic groups with a terminal unsaturated bond;
(B) an organohydrogenpolysiloxane having in a molecule thereof at least three hydrogen atoms bonded to silicon atoms, in such an amount that a ratio (H/V ratio) of the number of said hydrogen atoms per one unsaturated bond in the component (A) is from 0.5 to 5;

(C) a catalytic amount of a catalytic substance for hydrosilylation reaction;

(D) 10 to 300 parts by weight of polyorganosilsesquioxane particles; and (E) 1 to 50 parts by weight of hydrophobic silica particles so that the number of silanol groups per a unit surface area is not greater than $1 nm^2$ and a hydrophobic index is not smaller than 60%, said hydrophobic index is defined by methanol concentration by volume % in an aqueous methanol solution containing 50 ml of water in a condition to be able to suspend completely 0.2 g of said silica particles at lowest methanol concentration.

2. A dental soft relining material according to claim 1, wherein said organopolysiloxane (A) has a viscosity of from 10 to 1500 poises at 25° C.

3. A dental soft relining material according to claim 1, wherein said hydrophobic silica particles (E) have a number of silanol groups per a unit surface area of not greater than $0.3/nm^2$ and a hydrophobic index of not smaller than 60%.

4. A dental soft relining material according to claim 1, wherein, per 100 parts by weight of said organopolysiloxane (A), said organohydrogenpolysiloxane (B) is contained in such an amount that a ratio $[SiH]_B/[C=C]_A$, wherein $[C=C]_A$ is a total number of terminal unsaturated bonds present in the organopolysiloxane (A), and $[SiH]_B$ is a total number of SiH groups present in the organohydrogenpolysiloxane (B), is from 0.5 to 3, a platinum catalyst is contained as said catalytic substance (C) for hydrosilylation reaction in an amount of from 0.1 to 1000 ppm with respect to the total weight of the components (A) and (B), said polyorganosilsesquioxane particles (D) are contained in an amount of from 10 to 200 parts by weight, and said hydrophobic silica particles (E) are contained in an amount of from 1 to 20 parts by weight.

5. A dental soft relining material according to claim 1, wherein said organohydrogenpolysiloxane (B) and said catalytic substance (C) for hydrosilylation reaction are contained in two packages in a state in which they do not exist together.

6. A dental soft relining material according to claim 1, wherein (F) an organohydrogenpolysiloxane containing in a molecule thereof two or one hydrogen atoms bonded to silicon atoms, is contained in such an amount that a ratio $[SiH]_F/[C=C]_A$, wherein $[C=C]_A$ is a total number of terminal unsaturated bonds present in the organopolysiloxane (A), and $[SiH]_F$ is a total number of SiH groups present in the organohydrogenpolysiloxane (F), is from 0.1 to 5.

7. A method of repairing a denture by applying;

a dental soft relining material comprising:

(A) 100 parts by weight of an organopolysiloxane having in a molecule thereof at least two organic groups with a terminal unsaturated bond;

(B) an organohydrogenpolysiloxane having in a molecule thereof at least three hydrogen atoms bonded to silicon atoms, in such an amount that a ratio (H/V ratio) of the number of said hydrogen atoms per one unsaturated bond in the component (A) is from 0.5 to 5;

(C) a catalytic amount of a catalytic substance for hydrosilylation reaction;

(D) 10 to 300 parts by weight of polyorganosilsesquioxane particles; and (E) 1 to 50 parts by weight of hydrophobic silica particles so that the number of silanol groups per a unit surface area is not greater than $1/nm^2$ and a hydrophobic index is not smaller than 60%;

to the mucosa surface of the denture and/or to the alveolar model, and, then, adhering said denture to the residual ridge or the alveolar model with force, followed by curing said relining material.

8. A denture comprising a denture and a soft relining material layer provided on the side of the mucosa surface of the denture, wherein said soft relining material layer comprises a cured product of a dental soft relining material comprising:

(A) 100 parts by weight of an organopolysiloxane having in a molecule thereof at least two organic groups with a terminal unsaturated bond;

(B) an organohydrogenpolysiloxane having in a molecule thereof at least three hydrogen atoms bonded to silicon atoms, in such an amount that a ratio (H/V ratio) of the number of said hydrogen atoms per one unsaturated bond in the component (A) is from 0.5 to 5;

(C) a catalytic amount of a catalytic substance for hydrosilylation reaction;

(D) 10 to 300 parts by weight of polyorganosilsesquioxane particles; and (E) 1 to 50 parts by weight of hydrophobic silica particles so that the number of silanol groups per a unit surface area is not greater than $1/nm^2$ and a hydrophobic index is not smaller than 60%.

* * * * *